United States Patent
Minamihaba et al.

(10) Patent No.: US 6,924,227 B2
(45) Date of Patent: Aug. 2, 2005

(54) SLURRY FOR CHEMICAL MECHANICAL POLISHING AND METHOD OF MANUFACTURING SEMICONDUCTOR DEVICE

(75) Inventors: Gaku Minamihaba, Kawasaki (JP); Hiroyuki Yano, Yokohama (JP); Nobuyuki Kurashima, Yokohama (JP); Nobuo Kawahashi, Yokkaichi (JP); Masayuki Hattori, Aichi-ken (JP); Kazuo Nishimoto, Yokkaichi (JP)

(73) Assignees: Kabushiki Kaisha Toshiba, Tokyo (JP); JSR Corporation, Tokyo (JP)

( * ) Notice: Subject to any disclaimer, the term of this patent is extended or adjusted under 35 U.S.C. 154(b) by 0 days.

(21) Appl. No.: 09/932,943

(22) Filed: Aug. 21, 2001

(65) Prior Publication Data

US 2002/0023389 A1 Feb. 28, 2002

(30) Foreign Application Priority Data

Aug. 21, 2000 (JP) .................................. 2000-249129

(51) Int. Cl.$^7$ .......................................... H01L 21/4763
(52) U.S. Cl. .................. 438/633; 438/637; 438/672; 438/687; 438/692; 438/693
(58) Field of Search ................................ 438/633, 637, 438/672, 692, 693, 687; 451/36; 106/3; 216/38, 89

(56) References Cited

U.S. PATENT DOCUMENTS

| | | | |
|---|---|---|---|
| 5,527,370 A | * | 6/1996 | Kubo et al. ................ 51/309 |
| 5,575,837 A | | 11/1996 | Kodama et al. |
| 5,958,794 A | * | 9/1999 | Bruxvoort et al. .......... 438/692 |
| 6,332,835 B1 | * | 12/2001 | Nishimura et al. ........... 451/67 |
| 6,375,694 B1 | | 4/2002 | Roberts et al. |
| 6,407,000 B1 | * | 6/2002 | Hudson ..................... 438/693 |
| 6,409,781 B1 | * | 6/2002 | Wojtczak et al. ............ 51/308 |
| 6,464,740 B1 | * | 10/2002 | Towery et al. .............. 51/307 |
| 6,551,175 B2 | | 4/2003 | Koichi et al. |

FOREIGN PATENT DOCUMENTS

| | | | |
|---|---|---|---|
| EP | 0 933 166 B1 | 8/1999 | |
| JP | 11-315273 | 11/1999 | |
| JP | 2001-3036 | 1/2001 | |
| JP | 1 123956 | * 8/2002 | ............ C09G/1/02 |
| KR | 2000-0006327 | 1/2000 | |
| KR | 2000-0023851 | 4/2000 | |

OTHER PUBLICATIONS

Taiwanese Patent Publication No. 428023, published Apr. 1, 2001.

* cited by examiner

Primary Examiner—Hsien-Ming Lee
(74) Attorney, Agent, or Firm—Finnegan, Henderson, Farabow, Garrett & Dunner, LLP.

(57) ABSTRACT

A method of manufacturing a semiconductor device uses a slurry for chemical polishing during the manufacturing process, the slurry containing polishing particles comprising colloidal particles whose primary particles have a diameter ranging from 5 to 30 nm, wherein the degree of association of the primary particles is 5 or less. This slurry for chemical mechanical polishing makes it possible to minimize erosion and scratching whenever a conductive material film is subjected to CMP treatment.

20 Claims, 6 Drawing Sheets

SLURRY FOR CHEMICAL MECHANICAL POLISHING AND METHOD OF MANUFACTURING SEMICONDUCTOR DEVICE

CROSS-REFERENCE TO RELATED APPLICATIONS

This application is based upon and claims the benefit of priority from the prior Japanese Patent Application No. 2000-249129, filed Aug. 21, 2000, the entire contents of which are incorporated herein by reference.

BACKGROUND OF THE INVENTION

1. Field of the Invention

This invention relates to a slurry for CMP (Chemical Mechanical Polishing), in particular to a slurry for CMP, which is adapted to be employed for forming a damascene wiring consisting mainly of metal such as Al, Cu or W, which is designed to be mounted on a DRAM or a high-speed logic LSI. This invention also relates to method of manufacturing a semiconductor device where such a slurry is employed.

2. Description of the Related Art

In recent years, to meet the trend to further enhance the performance of LSI, the techniques to further refine, densify and multi-laminate the wirings thereof have been rapidly advanced in the manufacture of semiconductor devices. Further, not only the miniaturization of design rule, but also the introduction of novel materials is actively practiced. For example, wiring materials containing Cu as a main component, as well as on interlayer dielectric films (ILD) formed of a low dielectric material such as an organic material or a porous material are being developed now.

In particular, the CMP technique is advantageous in that when it is applied to a dual damascene process where wirings and connecting wirings are designed to be buried in an insulating film, the number of manufacturing steps can be reduced. Further, since it is possible according to the CMP technique to alleviate the magnitude of roughness of the top surface of wafer, the focus margin in a lithography process can be sufficiently secured. Furthermore, it is also possible according to the CMP technique to form a wiring by making use of a material which is difficult to dry-etch such as Cu.

It is demanded at present that the process of forming a metal damascene wiring be enhanced in polishing speed in order to improve the throughput. Further, it is desired, for the purpose of obtaining a high-performance wiring, to develop a CMP treatment wherein the erosion as well as scratching of the metallic portions of wirings and of the interlayer insulating films can be minimized. The term erosion herein means a loss of metal due to the dishing resulting from an over-etching of wirings as well as a loss of metal due to the thinning resulting from an over-etching of insulating films.

The performance of CMP depends largely on a slurry and on a polishing pad to be employed therein. The polishing pad is required to have some degree of hardness for minimizing the erosion. If a polishing pad which is softer than the hard pad which is available from Rodel Co., Ltd. (IC1000-Pad) is employed, it would be difficult to control the erosion even if an ordinary slurry is employed.

Although it is possible to minimize the erosion by making use of the aforementioned hard pad, it may lead to the scratching of wirings and interlayer insulating films or to the peel-off of interlayer insulating films due to the scratching by coarse particles or excessively large aggregates contained in the slurry. Namely, according to the prior art, the minimal erosion and the minimal scratching are related with each other in a state of trade-off. Therefore, it is imperative for the purpose of concurrently minimizing both of the aforementioned erosion and scratching to improve the features of slurry.

A slurry adapted for use in the CMP is formed of a composition wherein polishing particles is dispersed in water. As for the polishing particles made of silica or alumina which are formed by means of fuming method has been conventionally employed. The polishing particles obtained in this manner is featured in that they are low in manufacturing cost and high in purity. Further, the particles produced by means of fuming method is transformed into an aggregate (secondary particles) during the manufacturing steps thereof, and due to the action of the aggregate, the polishing rate is assumed to be enhanced.

However, the particles produced by means of fuming method is very poor in uniformity in diameter of the primary particles so that the secondary particles tends to become too large, thus easily enabling far larger particles to be produced. As a result, it is difficult to strictly control the performance of the CMP.

BRIEF SUMMARY OF THE INVENTION

According to a first aspect of the present invention, there is provided a slurry for CMP, which contains polishing particles comprising colloidal particles whose primary particles have a diameter ranging from 5 to 30 nm, wherein the degree of association of the primary particles is 5 or less.

According to a second aspect of the present invention, there is also provided a slurry for CMP, which contains polishing particles comprising first colloidal particles whose primary particles have a diameter ranging from 5 to 20 nm, and second colloidal particles which are made of the same material as that of the first colloidal particles and whose primary particles have a diameter larger than 20 nm, wherein the weight ratio of the first colloidal particles is in the range of 0.6 to 0.9 based on a total weight of the first and second colloidal particles.

According to a third aspect of the present invention, there is also provided a method of manufacturing a semiconductor device, which comprises:

forming a wiring groove on a surface of an insulating film formed above a semiconductor substrate;

depositing a conductive material film on a surface of the insulating film including an inner surface of the wiring groove; and subjecting the conductive material film to a chemical mechanical polishing by making use of either a slurry for chemical mechanical polishing, which contains polishing particles comprising colloidal particles whose primary particles have a diameter ranging from 5 to 30 nm, wherein the degree of association of the primary particles is 5 or less, or a slurry for chemical mechanical polishing, which contains polishing particles comprising first colloidal particles whose primary particles have a diameter ranging from 5 to 20 nm, and second colloidal particles which are made of the same material as that of the first colloidal particles and whose primary particles have a diameter larger than 20 nm, wherein the weight ratio of the first colloidal particles is in the range of 0.6 to 0.9 based on a total weight of the first and second colloidal particles to remove the conductive material film excluding a conductive material film portion which is buried in the wiring groove.

According to a forth aspect of the present invention, there is provided a method of manufacturing a semiconductor device, which comprises:

forming a wiring groove on a surface of an insulating film formed above a semiconductor substrate;

depositing a conductive barrier film on a surface of the insulating film including an inner surface of the wiring groove;

depositing a wiring material film on the conductive barrier film to fill the wiring groove with the wiring material film;

subjecting the wiring material film to a chemical mechanical polishing to remove the wiring material film excluding a wiring material film portion which is buried in the wiring groove, the chemical mechanical polishing taking place, with the conductive barrier film on the insulating film being employed as a stopper, except for a conductive barrier film portion located inside the wiring groove; and subjecting a conductive barrier film portion which is located on the insulating film excluding the wiring groove to a chemical mechanical polishing by making use of either a slurry for chemical mechanical polishing, which contains polishing particles comprising colloidal particles whose primary particles have a diameter ranging from 5 to 30 nm, wherein the degree of association of the primary particles is 5 or less, or a slurry for chemical mechanical polishing, which contains polishing particles comprising first colloidal particles whose primary particles have a diameter ranging from 5 to 20 nm, and second colloidal particles which are made of the same material as that of the first colloidal particles and whose primary particles have a diameter larger than 20 nm, wherein the weight ratio of the first colloidal particles is in the range of 0.6 to 0.9 based on a total weight of the first and second colloidal particles.

DETAILED DESCRIPTION OF THE INVENTION

The slurry for CMP according to embodiments of the present invention will be explained in detail as follows.

(1) Slurry for CMP

This slurry for CMP comprises water, preferably pure water, and polishing particles formed of colloidal particles and dispersed in the water, wherein the primary particles of the colloidal particles have a diameter ranging from 5 to 30 nm, and the degree of association of the primary particles is 5 or less.

Figure 3:
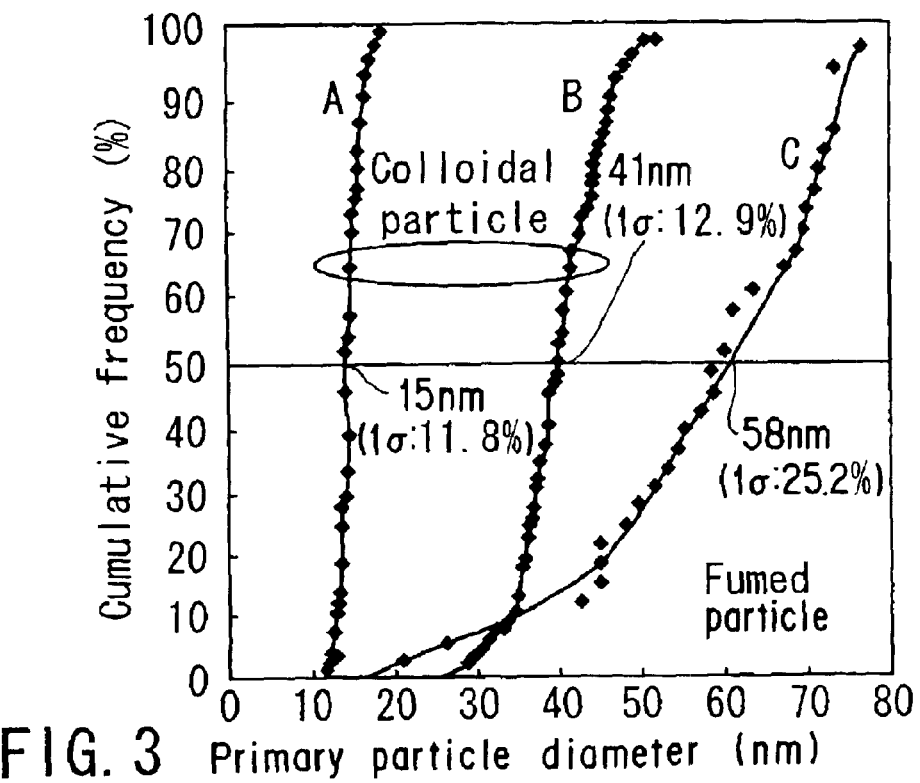
FIG. 3 is a graph illustrating the non-uniformity between the colloidal particles and the fumed particles contained in a slurry for the CMP.

As for the colloidal particles, it is possible to employ colloidal silica particles. The colloidal silica particles can be obtained by hydrolyzing a silicon alkoxide compound such as $Si(OC_2H_5)_4$, $Si(sec-OC_4H_9)_4$, $Si(OCH_3)_4$ or $Si(OC_4H_9)_4$ in the sol-gel method. Such colloidal particles (e.g., a colloidal silica particles) exhibit a very acute curve of particle size distribution, as shown in FIG. 3 (described later).

The diameter of primary particles is intended to refer to a particle diameter that corresponds to the 50% point of cumulative frequency in a particle size accumulation curve, which shows the relationships between the particle diameter of a colloidal particles and a cumulative frequency obtained by accumulating the number of particles having that particle diameter. The particle diameter of the colloidal particles can be measured by use of an electron microphotograph.

The reasons for limiting the diameter of the primary particles of the colloidal particles in this invention are as follows. Namely, if the diameter of the primary particles of the colloidal particles is less than 5 nm, the polishing performance of the slurry containing such colloidal particles as polishing particles may be deteriorated. On the other hand, if the diameter of the primary particles of the colloidal particles exceeds over 30 nm, it may lead to the generation of erosion and scratching on the occasion of polishing a wiring using a slurry containing such colloidal particles as polishing particles. A more preferable range of the diameter of the primary particles of the colloidal particles is from 10 to 20 nm.

The phrase "the degree of association" means a value which can be obtained by dividing the value of diameter of the secondary particles consisting of associated primary particles by the value of diameter of the primary particles (the diameter of secondary particles/the diameter of primary particles). Therefore, if the degree of association is 1, it means merely the primary particles which are monodispersed. The diameter of the secondary particles can be measured by means of a dynamic light scattering method, a laser diffraction method or an electron microscopic method.

The reasons for limiting the degree of association in this invention are as follows. Namely, if the degree of association exceeds over 5, it may lead to the generation of erosion and scratching on the occasion of polishing a wiring using a slurry containing the colloidal particles of such an association degree as polishing particles.

Preferably, the diameter of the associated colloidal particles should be confined to 100 nm or less.

The content of the polishing particles in the slurry should preferably be confined to the range of from 0.5 to 5% by weight. If the content of the polishing particles is less than 0.5% by weight, the polishing performance of the slurry containing such polishing particles would be deteriorated. On the other hand, if the content of the polishing particles exceeds over 5% by weight, it may lead to the generation of erosion and scratching on the occasion of polishing a wiring using a slurry containing such polishing particles. Therefore, a more preferable content of polishing particles would be in the range of from 0.5 to 2% by weight.

The content of the polishing particles (i.e., colloidal particles) in the slurry may be 5% by weight at maximum. In this case, the colloidal particles presented in a formation of primary particles can be inhibited from changing to secondary particles, reducing the degree of association of colloidal particles to the value of 5 or less. This suppresses the erosion and scratching at the time of polishing the wiring with the slurry containing these polishing particles.

With respect to the pH of the slurry for CMP, although the pH of the slurry should preferably be deviated from the isoelectric point of the colloidal particles by a magnitude of about ±1, the pH of the slurry can be fundamentally selected from the region of 0.5 to 12.

The slurry for CMP may further contain at least one component selected from the group consisting of 1) an oxidizing agent, 2) an oxidation inhibitor, and 3) a surfactant as explained below.

1) Oxidizing Agent:

Specific examples of this oxidizing agent include ammonium persulfate, potassium persulfate, hydrogen peroxide, ferric nitrate, and ammonium cerium nitrate. A preferable content of this oxidizing agent in the slurry is in the range of from 0.1 to 5% by weight.

2) Oxidation Inhibitor:

Specific examples of this oxidation inhibitor include an organic acid such as quinaldinic acid, quinolinic acid, malonic acid, oxalic acid or succinic acid, and an amino acid such as glycine, alanine or tryptophan. Among these oxidation inhibitor, quinaldinic acid, quinolinic acid and glycine are preferably used for handling. A preferable content of this oxidation inhibitor in the slurry is in the range of from 0.01 to 3% by weight.

3) Surfactant:

This surfactant is designed to function to minimize the erosion and scratching on the occasion of polishing. Specific examples of this oxidation inhibitor include an anionic surfactant, a cationic surfactant, and a nonionic surfactant. Among these surfactants, dodecylbenzene sulfonate, polyoxyethylene alkylamine, and polyoxyethylene lauryl ether are preferable for use. A preferable content of this oxidation inhibitor in the slurry is in the range of from 0.01 to 1% by weight.

(2) Slurry for CMP

This slurry for CMP comprises water, preferably pure water, and polishing particles formed of colloidal particles and dispersed in the water, wherein the polishing particles comprises first colloidal particles whose primary particles have a diameter ranging from 5 to 20 nm, and second colloidal particles which are made of the same material as that of the first colloidal particles and whose primary particles have a diameter larger than 20 nm, the weight ratio of the first colloidal particles being in the range of 0.6 to 0.9 based on a total weight of the first and second colloidal particles.

As for the first and second colloidal particles, it is possible to employ colloidal silica particles. The colloidal silica particles can be obtained by hydrolyzing a silicon alkoxide compound such as $Si(OC_2H_5)_4$, $Si(sec-OC_4H_9)_4$, $Si(OCH_3)_4$, $Si(OC_4H_9)_4$ by means of sol-gel method. Such the first and second colloidal particles (e.g., a first and second colloidal silica particles) exhibit a very acute curve of particle size distribution, as shown in FIG. 3 (described later).

The diameter of primary particles of the first and second colloidal particles is intended to refer to a particle diameter that corresponds to the 50% point of cumulative frequency in a particle size accumulation curve, which shows the relationships between the particle diameter of a colloidal particles and a cumulative frequency obtained by accumulating the number of particles having that particle diameter. The particle diameter of the colloidal particles can be measured by use of an electron microphotograph.

Preferably, the degree of association of the first colloidal particles is not more than 5 (the degree of association was defined in the "(1) Slurry for CMP" above).

The diameter of the primary particles of the second colloidal particles should preferably be larger than 20 nm but not larger than 50 nm.

The reasons for limiting the weight ratio of the first colloidal particles in the polishing particles (the first colloidal particles/a total weight of the first and second colloidal particles) to the range of 0.6 to 0.9 are as follows. Namely, if the aforementioned weight ratio is less than 0.6, it may lead to the generation of erosion and scratching on the occasion of polishing a wiring using a slurry containing such first and second colloidal particles as polishing particles. On the other hand, if the aforementioned weight ratio exceeds over 0.9, the polishing performance of the slurry containing such first and second colloidal particles as polishing particles may be deteriorated.

The content of the polishing particles in the slurry should preferably be confined to the range of from 0.5 to 5% by weight. If the content of the polishing particles is less than 0.5% by weight, the polishing performance of the slurry containing such polishing particles would be deteriorated. On the other hand, if the content of the polishing particles exceeds over 5% by weight, it may lead to the generation of erosion and scratching on the occasion of polishing a wiring using a slurry containing such polishing particles. Therefore, a more preferable content of polishing particles would be in the range of from 1 to 3% by weight. In particular, the content of the second colloidal particles in the slurry should preferably be confined at most to 0.4% by weight.

With respect to the pH of the slurry for CMP, although the pH of the slurry should preferably be deviated from the isoelectric point of the colloidal particles by a magnitude of about ±1, the pH of the slurry can be fundamentally selected from the region of 0.5 to 12.

The polishing particles to be incorporated in the slurry for CMP may further contain third particles which are formed of a different material from that of the first and second colloidal particles in addition to the first and second colloidal particles. It is possible to employ, as the third particles, at least one kind of particles selected from the group consisting of cerium oxide, manganese oxide, silica, alumina and zirconia.

As for this third particles, the employment of colloidal alumina particles is preferable in particular. The colloidal alumina particles can be obtained by hydrolyzing an aluminum alkoxide compound such as $Al(iso\text{-}OC_3H_7)_3$, $Al(OCH_3)_3$, $Al(OC_2H_5)_3$ by means of sol-gel method.

The diameter of the primary particle of the third particles should preferably be within the range of 5 to 30 nm (the primary particle diameter was defined in the "(1) Slurry for CMP" above). The content of the third particles should preferably be incorporated in the slurry at a ratio of 40% by weight based on the total weight of the first and second colloidal particles.

The slurry for CMP may further contain at least one component selected from the aforementioned group consisting of 1) an oxidizing agent, 2) an oxidation inhibitor, and 3) a surfactant as explained above.

Figure 1:
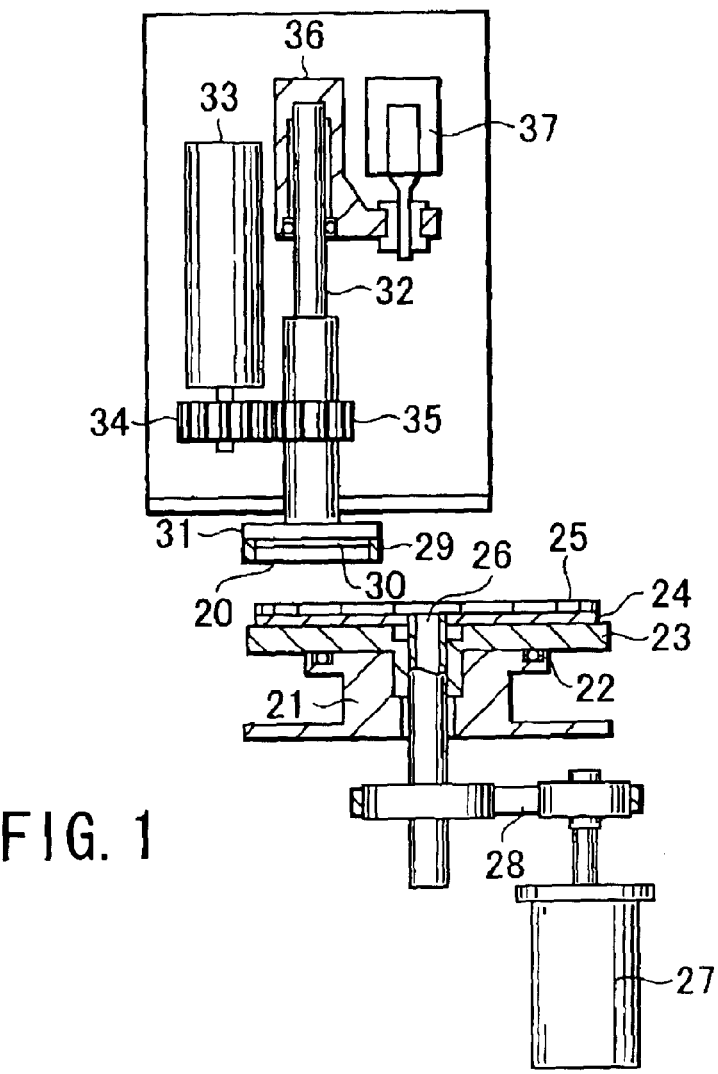
FIG. 1 is a cross-sectional view illustrating a polishing device to be employed for the CMP treatment.
Figure 2:
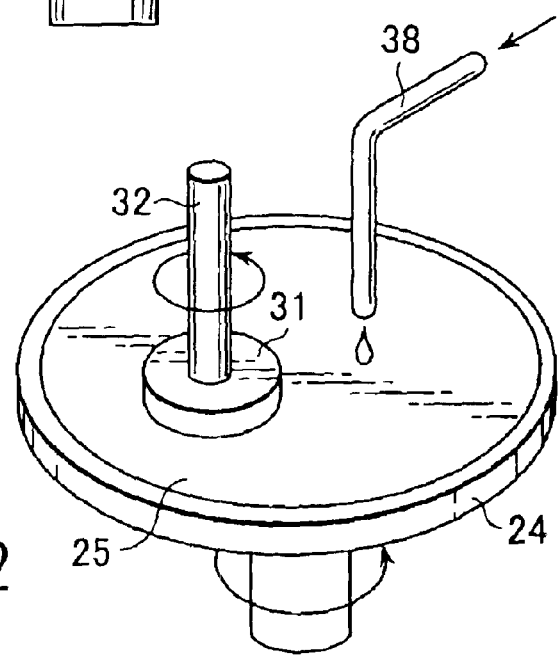
FIG. 2 is a perspective view illustrating a main portion of the polishing device shown in FIG. 1.

The polishing of a conductive material film formed on a substrate for instance by making use of the aforementioned slurry for CMP can be performed using a polishing apparatus shown in FIGS. 1 and 2. FIG. 1 shows a cross-sectional view of the polishing apparatus which is adapted to be used for the CMP treatment, and FIG. 2 shows a perspective view of a main portion of the polishing apparatus shown in FIG. 1.

Referring to FIGS. 1 and 2, a polishing disk receiver 23 is placed via a bearing 22 on a stage 21. A polishing disk (turn table) 24 is mounted on the polishing disk receiver 23. A polishing pad 25 is stuck on the polishing disk 24. A driving shaft 26 is coaxially connected with the polishing disk receiver 23 and the polishing disk 24 so as to enable these disk 24 and disk receiver 23 to rotate about their centers. This driving shaft 26 is designed to be rotated by means of a motor 27 through a rotary belt 28.

A substrate, for example, a semiconductor wafer 20 bearing thereon a conductive material film is disposed at a position facing the polishing pad 25 and secured to an adsorption cloth 30 mounted, by means of vacuum or coated water, on an adsorption disk (top ring) 31 and also to a template 29. The top ring 31 is coupled with a driving shaft 32 which is designed to be rotated by a motor 33 through a couple of gears 34 and 35. A driving stand 36 is fixed to the driving shaft 32. A cylinder 37 is attached to the driving stand 36 in such a manner that it can be moved up and down so as to concurrently enable the driving stand 36 to move up and down. A slurry feeding pipe 38 is extended from a slurry tank (not shown), and a distal end thereof is disposed over the polishing pad 25.

According to this polishing apparatus, as the motor 27 is actuated, the polishing disk 24 attached to the polishing pad 25 is forced to rotate. On the other hand, a semiconductor wafer 20 is secured to the top ring 31, and then, the motor 33 is actuated so as to rotate the top ring 31 in the same direction as that of the polishing pad 25, and at the same time, the cylinder 37 is descended, thereby enabling the semiconductor wafer 20 which is secured to the top ring 31 to be pressed onto the polishing pad 25. On this occasion, a slurry for CMP in the slurry tank is dropped via the slurry feeding pipe 38 onto the polishing pad 25 so as to feed the slurry to an interface between the polishing pad 25 and the semiconductor wafer 20, both rotating in the same direction with each other and being slidably contacted with each other, thus performing the polishing of a conductive material film formed on the surface (rear surface in FIGS. 1 and 2) of wafer 20.

Next, the method of manufacturing a semiconductor device according to embodiments of the present invention will be explained further in detail.

(A First Step)

A wiring groove is formed on the surface of insulating film formed on a semiconductor substrate, and then, a conductive material film is formed all over the surface of the insulating film including the inner surface of the wiring groove.

As for the insulating film, it is possible to employ an inorganic insulating film such as a silicon oxide film which can be formed by making use of a silane gas or a TEOS gas, a low dielectric constant insulating film containing fluorine, or a Low-K insulating film which is soft, brittle, easily peelable and hydrophobic such as an organic film or a porous film.

As for the conductive material film, it may be a single wiring material film, or a laminate film composed of two or more layers comprising a conductive barrier film, and a wiring material film laminated on said barrier film, As for the wiring material film, it is possible to employ, for example, Cu, a Cu alloy such as a Cu—Si alloy, a Cu—Al alloy, a Cu—Si—Al alloy or a Cu—Ag alloy, Al, an Al alloy or W.

As for the conductive barrier film, it may be formed of a single layer, or two or more layers, each layer being formed of at least one kind of materials selected from the group consisting of TiN, Ti, Nb, W, WN, TaN, TaSiN, Ta, V, Mo, Zr and ZrN.

(A Second Step)

The conductive material film formed on the substrate is subjected to a CMP treatment by making use of the polishing apparatus shown in FIGS. 1 and 2 and the slurries illustrated in the aforementioned items (1) and (2), thereby removing all of the conductive material film excluding a conductive material film portion that has been buried in the wiring groove, thus forming a buried wiring (damascene wiring) in the insulating film.

When the aforementioned conductive material film is a laminate film composed of two or more layers comprising a conductive barrier film, and a wiring material film laminated on the barrier film, the wiring material film is subjected to a CMP treatment by making use of the polishing apparatus shown in FIGS. 1 and 2 and the slurries for CMP illustrated in the aforementioned items (1) and (2), after which the conductive barrier film located on the surface of the insulating film excluding the wiring groove is subjected to another CMP treatment by making use of a slurry having a different composition from that of the slurry employed in the wiring material film to remove the conductive barrier film, thereby forming a damascene wiring which is buried via the conductive barrier film in the insulating film.

Further, when the aforementioned conductive material film is a laminate film composed of two or more layers comprising a conductive barrier film, and a wiring material film laminated on the barrier film, the conductive material film i.e., the laminate film is subjected to a CMP treatment by making use of the polishing apparatus shown in FIGS. 1 and 2 and the slurry illustrated in the aforementioned item (2), i.e. the slurry for CMP which contains the first and second colloidal particles and also the third particles such as colloidal alumina particles to remove the laminate film, thereby forming a damascene wiring which is buried via the conductive barrier film in the insulating film.

Next, another method of manufacturing a semiconductor device according to embodiments of this invention will be explained.

(A First Step)

A wiring groove is formed on the surface of insulating film formed on a semiconductor substrate, and then, a conductive barrier film is deposited all over the surface of the insulating film including the inner surface of the wiring groove. Then, a wiring material film is deposited on the conductive barrier film so as to bury the wiring groove with the wiring material film.

As for the insulating film, the conductive barrier film and the wiring material film, it is possible to employ the same materials employed as mentioned above.

(A Second Step)

All of the wiring material film excluding a wiring material film portion which is buried in the wiring groove is subjected to a chemical mechanical polishing to remove. In this case, the chemical mechanical polishing taking place, with the conductive barrier film on the insulating film being employed as a stopper, except for a conductive barrier film portion located inside the wiring groove.

This chemical mechanical polishing can be performed by making use of a universal slurry for CMP.

(A Third Step)

The conductive barrier film located on the insulating film excluding the wiring groove is subjected to a CMP treatment by making use of the polishing apparatus shown in FIGS. 1 and 2 and the slurries illustrated in the aforementioned items (1) and (2), thereby forming a damascene wiring buried through the conductive barrier film in the insulating film.

Since a slurry for chemical mechanical polishing according to embodiments of the present invention has a composition containing polishing particles comprising colloidal particles whose primary particles have a diameter ranging from 5 to 30 nm, wherein the degree of association of the primary particles is 5 or less, it is possible to minimize the erosion and scratching on the occasion of the CMP treatment of a conductive material film such as a Cu film.

Further, since an another slurry for chemical mechanical polishing according to embodiments of the present invention has a composition containing polishing particles comprising first colloidal particles whose primary particles have a diameter ranging from 5 to 20 nm, and second colloidal particles which are made of the same material as that of the first colloidal particles and whose primary particles have a diameter larger than 20 nm, wherein the weight ratio of the first colloidal particles is in the range of 0.6 to 0.9 based on a total weight of said first and second colloidal particles, it is possible to accelerate the speed of the CMP and to minimize the erosion and scratching on the occasion of the CMP treatment of a conductive material film such as a Cu film.

FIG. 3 is a graph showing a logarithmic normal plot of the primary particles of the silica particles which has been formed in the fuming method, and of the colloidal silica particles which has been formed in the sol-gel method. In FIG. 3, the ordinate represents a cumulative frequency (%), and the abscissa represents a particle diameter (nm). Cumulative frequency curve A of the colloidal silica particles is a curve where the 50% point of cumulative frequency corresponds to a particle diameter of 15 nm (1σ; 11.8%), cumulative frequency curve B of the colloidal silica particles is a curve where the 50% point of cumulative frequency corresponds to a particle diameter of 41 nm (1σ; 12.9%), and cumulative frequency curve C of the silica particles prepared in the fuming method is a curve where the 50% point of cumulative frequency corresponds to a particle diameter of 58 nm (1σ; 25.2%).

As shown in FIG. 3, the colloidal silica particles are relatively minimal in non-uniformity of particle diameter as compared with the fumed silica particles. Further, the colloidal silica particles tend to hardly aggregate with each other, so that a bulky particles can be hardly produced. Therefore, the colloidal silica particles are easy to handle in viewpoint of controlling the colloidal silica particles.

Figure 4:
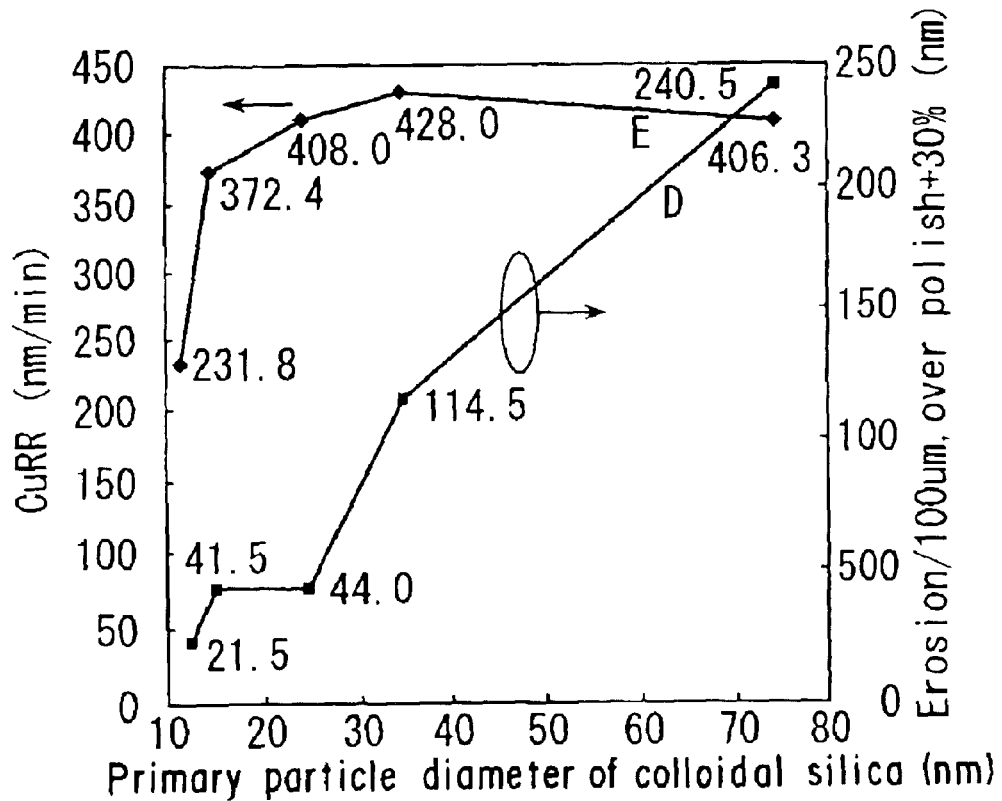
FIG. 4 is a graph illustrating the relationship between the primary particle diameter of colloidal particles contained in a slurry for the CMP and the polishing speed of Cu (CuRR), and between the primary particle diameter of colloidal particles contained in a slurry for the CMP and the erosion of wiring.

However, the colloidal particles are accompanied with a problem that as shown in FIG. 4 to be explained below, when the primary particle diameter thereof is as small as about 10 nm, the polishing speed is reduced, though the generation of erosion and scratching can be substantially prevented. On the other hand, when the primary particle diameter of the colloidal particles is larger than 30 nm, in particular, larger than 50 nm, the erosion and scratching are more likely to be generated, though the polishing speed can be enhanced.

Namely, FIG. 4 illustrates the influence of the changes in particle diameter (nm) of colloidal particles to be employed for the CMP treatment on the change of polishing speed of Cu (CuRR) and on the magnitude (nm) of the erosion. In FIG. 4, the left ordinate represents the polishing speed (nm/min), the right ordinate represents the magnitude (nm) of erosion, and the abscissa represents the particle diameter (nm) of the colloidal silica particles. In FIG. 4, the curve D is a characteristic curve which represents the relationship between the changes in primary particle diameter of colloidal particles and the magnitude of erosion; and the curve E is a characteristic curve which represents the relationship between the changes in primary particle diameter of colloidal particles and the magnitude of the polishing speed of Cu.

The colloidal particles is featured in that it tends to hardly form an aggregate, i.e., a secondary particles, and hence if the primary particle diameter thereof is relatively small, the generation of erosion and scratching can be suppressed, whereas if the primary particle diameter thereof is relatively large, the polishing speed can be enhanced.

As apparent from these facts, since the slurry for chemical mechanical polishing according to embodiments of the present invention has a composition containing polishing particles comprising colloidal particles whose primary particles have a diameter ranging from 5 to 30 nm, wherein the degree of association of the primary particles is 5 or less, it is possible to perform the CMP treatment of a conductive material film such as a Cu film while minimizing the generation of erosion and scratching.

Further, since the another slurry for chemical mechanical polishing according to embodiments of the present invention has a composition containing polishing particles comprising first colloidal particles whose primary particles have a diameter ranging from 5 to 20 nm, and second colloidal particles which are made of the same material as that of the first colloidal particles and whose primary particles have a diameter larger than 20 nm, wherein the weight ratio of the first colloidal particles is in the range of 0.6 to 0.9 based on a total weight of said first and second colloidal particles, it is possible to perform a high-speed CMP treatment of a conductive material film such as a Cu film, while minimizing the generation of erosion and scratching.

According to embodiments of the present invention, a wiring groove is formed on a surface of an insulating film formed on a semiconductor substrate, and then, a conductive material film is deposited on an entire surface of the insulating film including an inner surface of the wiring groove, after which the conductive material film is subjected to a CMP treatment by making use of the polishing apparatus shown in FIGS. 1 and 2 and the slurries illustrated in the aforementioned items (1) and (2) to thereby remove all of the conductive material film excluding the conductive material film which is buried in the wiring groove. As a result, a buried wiring (a damascene wiring) can be formed in the wiring groove of the insulating film, while minimizing the generation of erosion and scratching.

Further, according to embodiments of the present invention, a wiring groove is formed on a surface of an insulating film formed on a semiconductor substrate, and then, a conductive barrier film is deposited on an entire surface of the insulating film including an inner surface of the wiring groove, which is followed by the deposition of a wiring material film made of metal. Thereafter, the conductive material film is subjected to a CMP treatment with the aforementioned conductive barrier film being employed as a stopper, and the conductive barrier film thus exposed is subjected to another CMP treatment by making use of the polishing apparatus shown in FIGS. 1 and 2 and the slurries for CMP illustrated in the aforementioned items (1) and (2), thereby forming a wiring (damascene wiring) which is buried via the conductive barrier film in the wiring groove of the insulating film, while minimizing the generation of erosion and scratching.

In particular, when a damascene wiring is formed via a conductive barrier film in a wiring groove of a Low-K insulating film which is soft, brittle, easily peelable and hydrophobic such as an organic film or a porous film, the CMP treatment by making use of the slurries illustrated in the aforementioned items (1) and (2) can be performed in a manner which is soft and mild to the Low-K insulating film. Therefore, it is possible, on the occasion of performing a CMP treatment of the conductive barrier film of the Low-K insulating film, to form a wiring (damascene wiring) which is buried via the conductive barrier film in the wiring groove of the insulating film, while minimizing the generation of erosion and scratching and without causing the Low-K insulating film to be peeled away together with the conductive barrier film. As a result, it is now possible to manufacture a semiconductor device having a damascene wiring which makes it possible to inhibit the propagation delay originating from an insulating film of low dielectric constant and to realize a high-speed current transmission.

Followings are embodiments of this invention which will be explained with reference to drawings.

EXAMPLE 1

Figure 5A:
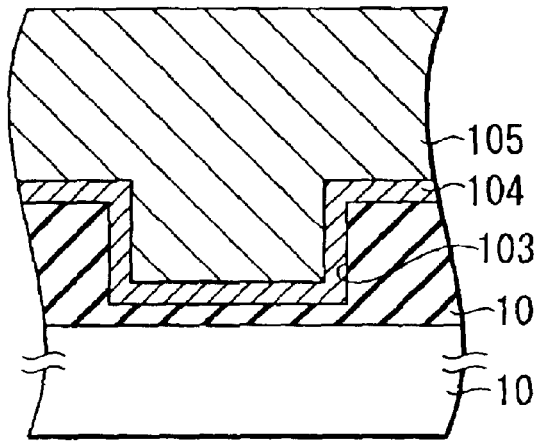
FIGS. 5A to 5C are cross-sectional views each illustrating the manufacturing process of semiconductor device according to Example 1 of the present invention.

First of all, as shown in FIG. 5A, an insulating film 102 consisting of silicon oxide, for example, was formed on a silicon substrate (silicon wafer) 101 provided with a semiconductor element, for instance, and then, the surface of the insulating film 102 was flattened. Thereafter, this insulating film 102 was selectively etched to form a wiring groove 103 having a depth of 400 nm. Then, a TaN film 104 about 10 nm in thickness as a barrier film was deposited on the insulating film 102 as well as on the inner surface of the wiring groove 103. Thereafter, a Cu film 105 having a thickness of 800 nm was deposited on the TaN film 104 at first by means of sputtering method and then, by means of plating method.

Figure 5B:
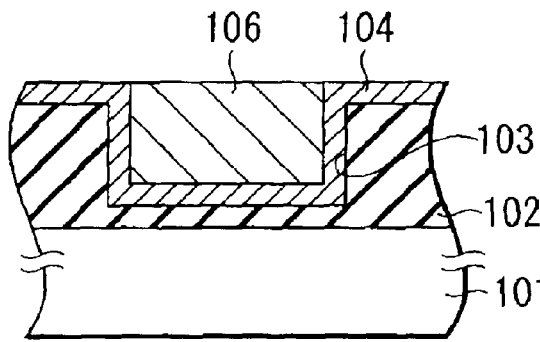

Then, the surface of the Cu film 105 was subjected to a CMP treatment by making use of the polishing apparatus shown in FIGS. 1 and 2 and a first CMP slurry having a composition shown below under the conditions as described below, thereby permitting the Cu film 105 to remain only inside the wiring groove 103 as shown in FIG. 5B. By the way, it was possible to stop the CMP treatment at the TaN film 104.

<The Composition of the First CMP Slurry>
Polishing particles: A first colloidal silica having a primary particle diameter of 15 nm and a degree of association of 3.0 (the first colloidal silica corresponds to colloidal silica particles A depicted in FIG. 3 described above) accounts for 0.8% by weight, and a second colloidal silica having a primary particle diameter of 41 nm and a degree of association of 3.0 (the second colloidal silica corresponds to colloidal silica particles B depicted in FIG. 3 described above) accounts for 0.2% by weight;
Ammonium persulfate (oxidizing agent) accounts for 1% by weight;
Quinaldinic acid (oxidation inhibitor) accounts for 0.5% by weight;
Potassium dodecylbenzene sulfonate accounts for 0.06% by weight;
pH=9.2 (adjusted by adding an aqueous solution of potassium hydroxide).

<Conditions for the CMP Treatment>
Polishing pad: IC1000/SUBA400 (tradename; Rodel Co., Ltd.);
Feeding rate of slurry: 200 cc/min;
Number of revolution of top ring (TR): 100 rpm;
Number of revolution of turn table (TT): 100 rpm;
Load (DF): 300 g/cm$^2$.

Figure 5C:
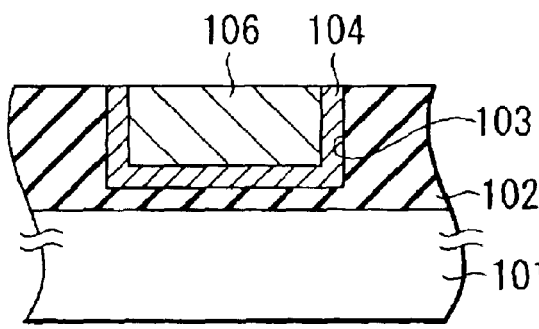

Then, the portion of TaN film 104 which was exposed on the insulating film 102 was subjected to a CMP treatment by making use of the polishing apparatus shown in FIGS. 1 and 2 and a second CMP slurry having a composition shown below under the conditions as described below. As a result of this CMP treatment, a Cu wiring (Cu damascene wiring) 106 buried through the TaN film 104 inside the wiring groove 103 was formed as shown in FIG. 5C.

<The Composition of the Second CMP Slurry>
Polishing particles: Colloidal silica having a primary particle diameter of 30 nm accounts for 3% by weight;
Ethylene diamine accounts for 0.05% by weight.

<Conditions for the CMP Treatment>
Feeding rate of slurry: 200 cc/min;
Polishing pad: IC1000/SUBA400 (tradename; Rodel Co., Ltd.);
Number of revolution of top ring (TR): 50 rpm;
Number of revolution of turn table (TT): 50 rpm;
Load (DF): 300 g/cm$^2$.

Figure 6:
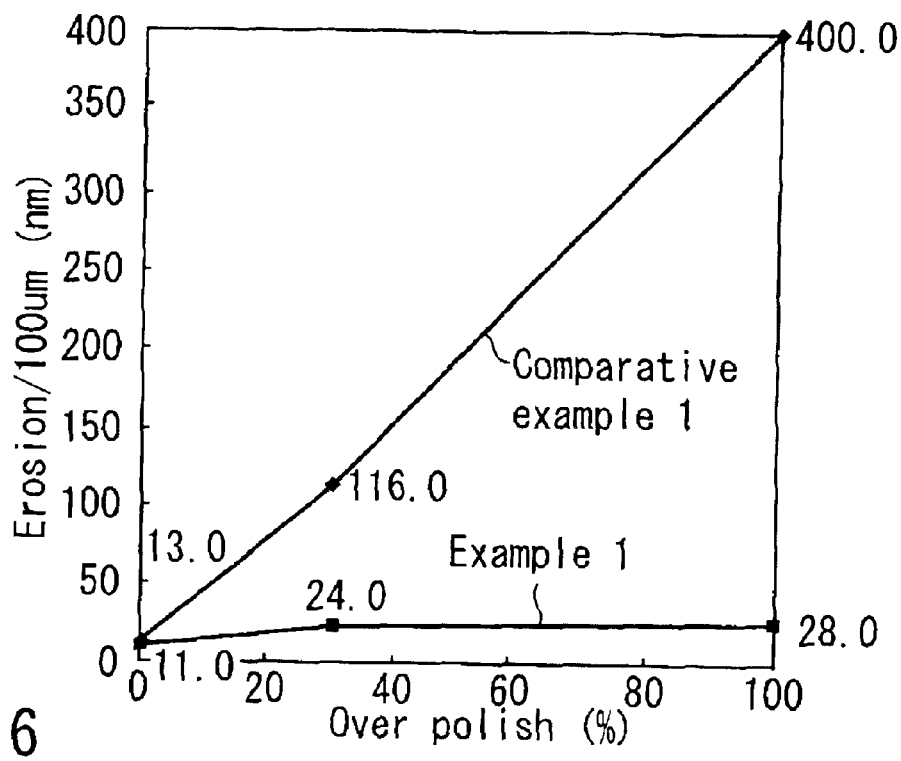
FIG. 6 is a graph illustrating the relationship between the over-polishing and the degree of erosion in the CMP treatment (features of CMP) of Example 1 and Comparative Example 1.

The features of CMP obtained by the CMP treatment of the Cu film in this Example 1 were shown in FIG. 6. FIG. 6 also shows the features of CMP obtained by the CMP treatment of the Cu film in Comparative Example 1 wherein the CMP treatment was performed under the same conditions as in Example 1 by making use of a CMP slurry having the same composition as that of Example 1 and the polishing apparatus shown in FIGS. 1 and 2, except that fumed silica particles (obtained by means of a fuming method) was employed as polishing particles. In FIG. 6, the ordinate represents the magnitude (nm) of erosion/wiring width 100 μm, and the abscissa represents an over-polishing (%). It should be noted that the erosion represents dimensions obtained when over-polishing is effected in the range of +0 to 100% with respect to a Cu film whose wiring width is 100 μm. In other words, the erosion indicates dimensions when the Cu film is over-polished for the period of time determined by both the polishing time required for just polishing (i.e., the time required for the Cu film other than the Cu film portion located inside the wiring groove to be polished away) and the additional polishing time in the range of 0 to 100%.

As apparent from FIG. 6, according to Comparative Example 1 wherein fumed silica particles ware employed as polishing particles, the erosion was 400 nm (the wiring width: 100 μm, the over-polishing: +100%). According to Comparative Example 1, the polishing rate of the Cu film was 432 nm/min.

In contrast, in the CMP treatment using the CMP slurry of Example 1 wherein the polishing particles comprising first colloidal silica particles having a primary particle diameter of 15 nm and second colloidal silica particles having a primary particle diameter of 41 nm were incorporated, the polishing rate of the Cu film was 520 nm/min, which indicated an improvement of about 20%. In addition, the erosion was 28 nm (the wiring width: 100 μm, the over-polishing: +100%), which was a remarkable improvement.

Figure 7:
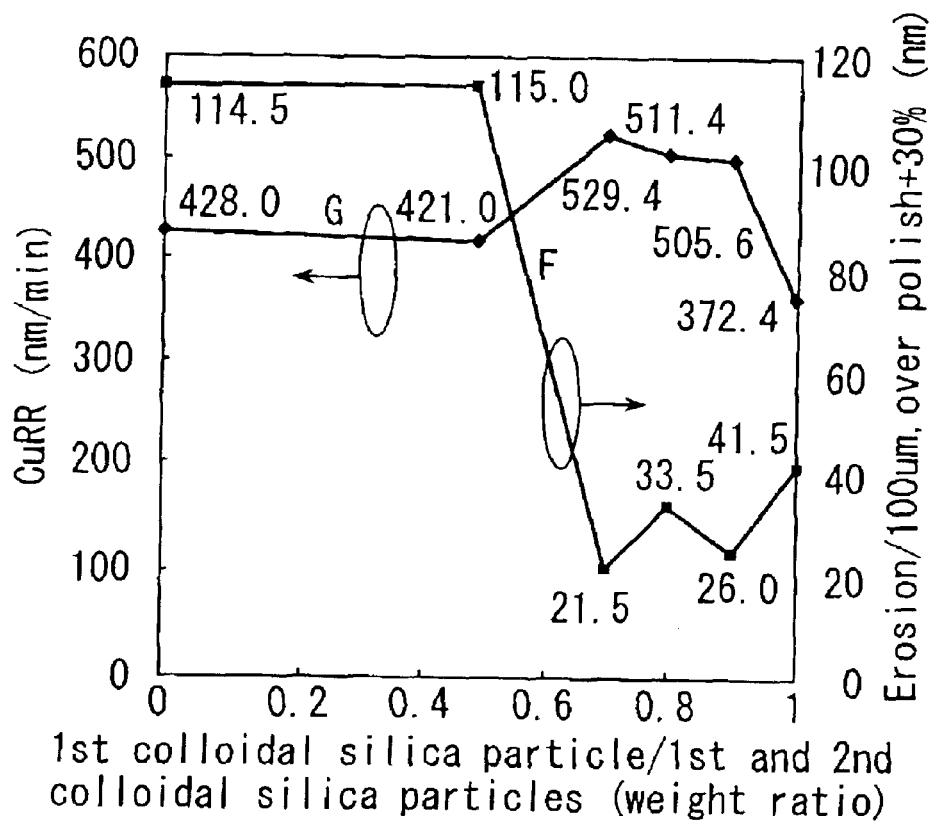
FIG. 7 is a graph illustrating the relationship between the mixing balance of the first and second colloidal particles in the CMP treatment of Example 1 and the polishing speed of Cu (CuRR), and between the mixing balance of the first and second colloidal particles in the CMP treatment of Example 1 and the erosion of wiring.

FIG. 7 shows a mixing balance between the first and second colloidal particles in the slurry employed in Example 1. In FIG. 7, the left ordinate represents the polishing speed of Cu (CuRR: nm/min), the right ordinate represents the magnitude (nm) of erosion, and the abscissa represents the ratio (weight ratio) of the first colloidal silica based on a total weight of the first and second colloidal silica particles. The curve F is a characteristic curve which represents the magnitude of erosion; and the curve G is a characteristic curve which represents the polishing speed of Cu.

As apparent from FIG. 7, when the ratio of the first colloidal silica was within the range of 0.6 to 0.9 based on a total weight of the first and second colloidal silica particles, it was possible to realize not only the minimization of erosion but also the enhancement of polishing speed.

Further, when the ratio of the first colloidal silica is confined within the range of 0.6 to 0.9 based on a total weight of the first and second colloidal silica particles, it becomes possible to realize a high-speed polishing of Cu film while inhibiting the polishing speed of the TaN film 104, thus enhancing the selective ratio between these two kinds of film in polishing them. For example, the polishing speed of the TaN film 104 can be controlled to ⅕ (about 3 nm/min) of that of the Cu film. As a result, it is possible to enable the TaN film 104 to be reliably functioned as a stopper in the polishing of the Cu film.

As explained above, according to this Example 1, since the polishing speed of Cu can be enhanced, it is possible not only to enhance the throughput but also to form a Cu damascene wiring of high-performance where the erosion resistance is prominently improved.

Additionally, since it is possible, according to the CMP slurry of this Example 1, to minimize the friction during the polishing treatment (the value of electric current in the torque sensor of table motor), this CMP slurry is also advantageous in preventing the peeling of the insulating film. Furthermore, since two kinds of colloidal silica particles were mixed together in this CMP slurry, the uniformity of polishing speed throughout the entire surface of wafer was enabled to be improved, in particular, the polishing speed at the edge of wafer was enabled to be enhanced, thereby making it possible to enhance the yield of wiring with regard to the short circuit up to 100% as against 80 to 90% in the case of Comparative Example 1.

EXAMPLE 2

Figure 8A:
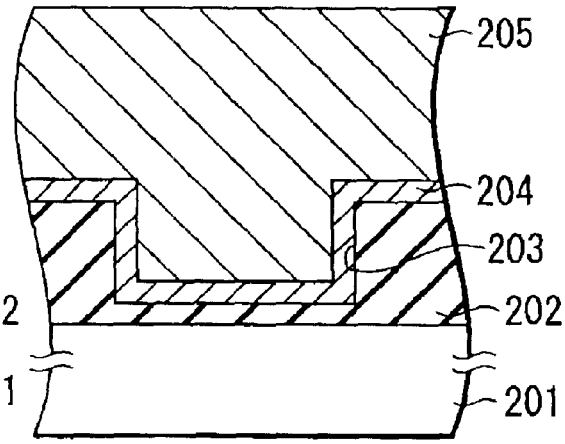
FIGS. 8A to 8C are cross-sectional views each illustrating the manufacturing process of semiconductor device according to Example 2 of the present invention.

First of all, as shown in FIG. 8A, an insulating film 202 was formed on a silicon substrate (silicon wafer) 201 provided with a semiconductor element, for instance, and then, the insulating film 202 was selectively etched to form a wiring groove 203 having a depth of 400 nm. This insulating film 202 was formed of a Low-K insulating film which was soft, brittle and easily peelable such as an organic film or a porous film. Then, a Nb film 204 about 15 nm in thickness as a barrier film was deposited on the insulating film 202 as well as on the inner surface of the wiring groove 203. Thereafter, an Al film 205 having a thickness of 800 nm was deposited on the Nb film 204 by means of sputtering method.

Figure 8B:
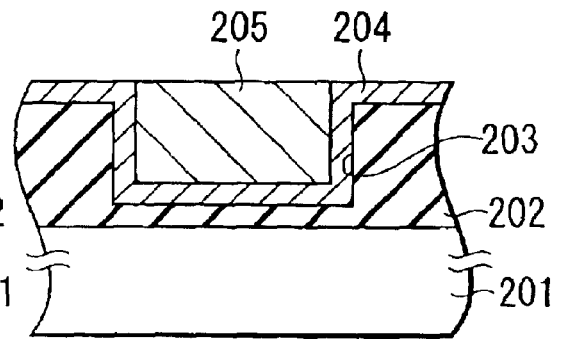

Then, the surface of the Al film 205 was subjected to a CMP treatment by making use of the polishing apparatus shown in FIGS. 1 and 2 and a first CMP slurry having a composition shown below under the conditions as described below, thereby permitting the Al film 205 to remain only inside the wiring groove 203 as shown in FIG. 8B. In this polishing step of the Al film 205, the Nb film 204 functioned as a stopper. As a result, even if a slurry containing a mixture of particles consisting of fumed alumina and silica as represented by the following composition was employed, the aforementioned brittle insulating film 202 was inhibited from being damaged.

<The Composition of the First CMP Slurry>

Polishing particles: A mixture of particles consisting of fumed alumina and silica;

Ammonium persulfate (oxidizing agent) accounts for 0.5% by weight;

Quinaldinic acid (oxidation inhibitor) accounts for 0.02% by weight;

<Conditions for the CMP Treatment>

Feeding rate of slurry: 200 cc/min;

Polishing pad: IC1000/SUBA400 (tradename; Rodel Co., Ltd.);

Number of revolution of top ring (TR): 100 rpm;

Number of revolution of turn table (TT): 100 rpm;

Load (DF): 300 g/cm².

Figure 8C:
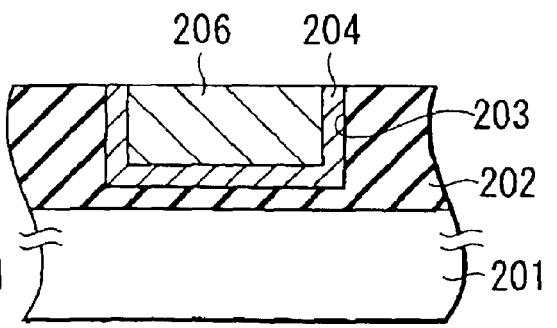

Then, the portion of Nb film 204 which was exposed on the insulating film 202 was subjected to a CMP treatment by making use of the polishing apparatus shown in FIGS. 1 and 2 and a second CMP slurry having a composition shown below under the conditions as described below. As a result of this CMP treatment, an Al wiring (Al damascene wiring) 206 buried through the Nb film 204 inside the wiring groove 203 was formed as shown in FIG. 8C.

<The Composition of the Second CMP Slurry>

Polishing particles: Colloidal silica having a primary particle diameter of 15 nm and a degree of association of 3.0 accounts for 0.8% by weight;

Ammonium persulfate (oxidizing agent) accounts for 1% by weight;

Quinaldinic acid (oxidation inhibitor) accounts for 0.05% by weight;

Cationic surfactant accounts for 0.025% by weight.

<Conditions for the CMP Treatment>

Polishing pad: Politex (tradename; Politex Co., Ltd.);

Feeding rate of slurry: 200 cc/min;

Number of revolution of top ring (TR): 60 rpm;

Number of revolution of turn table (TT): 100 rpm;

Load (DF): 300 g/cm².

It was possible, in this CMP treatment of the Nb film 204, to perform the polishing and to form the damascene wiring 206 without giving any damage to the Low-K insulating film which was soft, brittle and hydrophobic.

Figure 9:
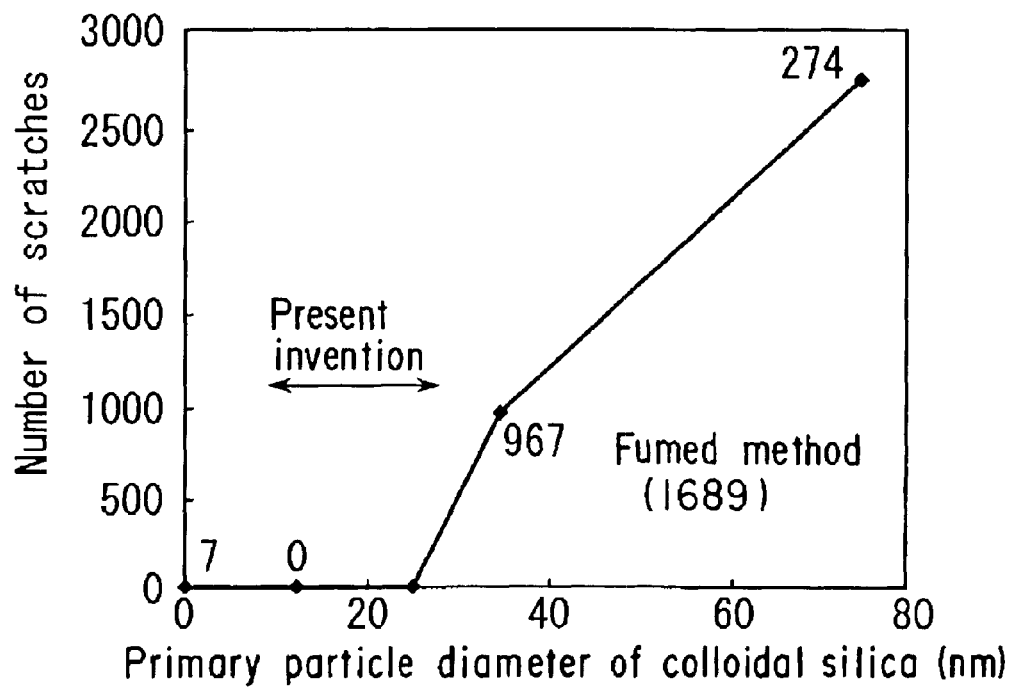
FIG. 9 is a graph illustrating the relationship between the primary particle diameter of colloidal particles and the number of scratch in the CMP treatment of Example 2.

FIG. 9 shows the relationship between the primary particle diameter of colloidal silica incorporated into the slurry and the number of scratch formed in the insulating film. In this case, all of colloidal silica particles have a degree of association of 3.0. In FIG. 9, the ordinate represents the number of scratch in the insulating film formed on a 8-inch wafer, and the abscissa represents the primary particle diameter (nm) of the colloidal silica.

As apparent from FIG. 9, when the CMP treatment was performed using a slurry containing, as polishing particles, colloidal silica particles whose primary particle diameter was larger than 30 nm, the number of scratch in the low-K insulating film was sharply increased.

Whereas when the CMP treatment was performed using a slurry of the example which contained, as polishing particles, colloidal silica particles whose primary particle diameter was within the range of 5 to 30 nm, the number of scratch in the low-K insulating film was sharply reduced to substantially zero.

As explained above, according to this Example 2, it is possible to perform a CMP treatment without giving damage to a Low-K insulating film which is soft, brittle and easily peelable such as an organic insulating film or a porous insulating film. Therefore, various defectives that may be generated on the occasion of forming a multi-layered damascene wiring, such as the peeling of an upper layer due to the scratching thereof of each layer, the short circuit of current due to a residual metal on the occasion of forming wirings, or an abnormal configuration of pattern due to focusing error in a lithography process can be greatly improved.

EXAMPLE 3

A semiconductor device was manufactured by burying a Cu wiring (damascene wiring) in a wiring groove with a TaN film being interposed therebetween according to the same procedures as explained in Example 1, except that a Cu film which was deposited on a silicon oxide insulating film formed on a silicon substrate (silicon wafer) provided with a semiconductor element, for example, was subjected to a CMP treatment by making use of the polishing apparatus shown in FIGS. 1 and 2 and a CMP slurry having a composition shown below under the conditions as described below.

<The Composition of the CMP Slurry>

Polishing particles: Colloidal silica particles differing in the degree of association and having a primary particle diameter of 25 nm accounts for 1.0% by weight;

Ammonium persulfate (oxidizing agent) accounts for 1% by weight;

Quinaldinic acid (oxidation inhibitor) accounts for 0.5% by weight;

Potassium dodecylbenzene sulfonate accounts for 0.06% by weight;

pH=9.2 (adjusted by adding an aqueous solution of potassium hydroxide).

<Conditions for the CMP Treatment>

Polishing pad: IC1000/SUBA400 (tradename; Rodel Co., Ltd.);

Feeding rate of slurry: 200 cc/min;

Number of revolution of top ring (TR): 100 rpm;

Number of revolution of turn table (TT): 100 rpm;

Load (DF): 300 g/cm$^2$.

Figure 10:
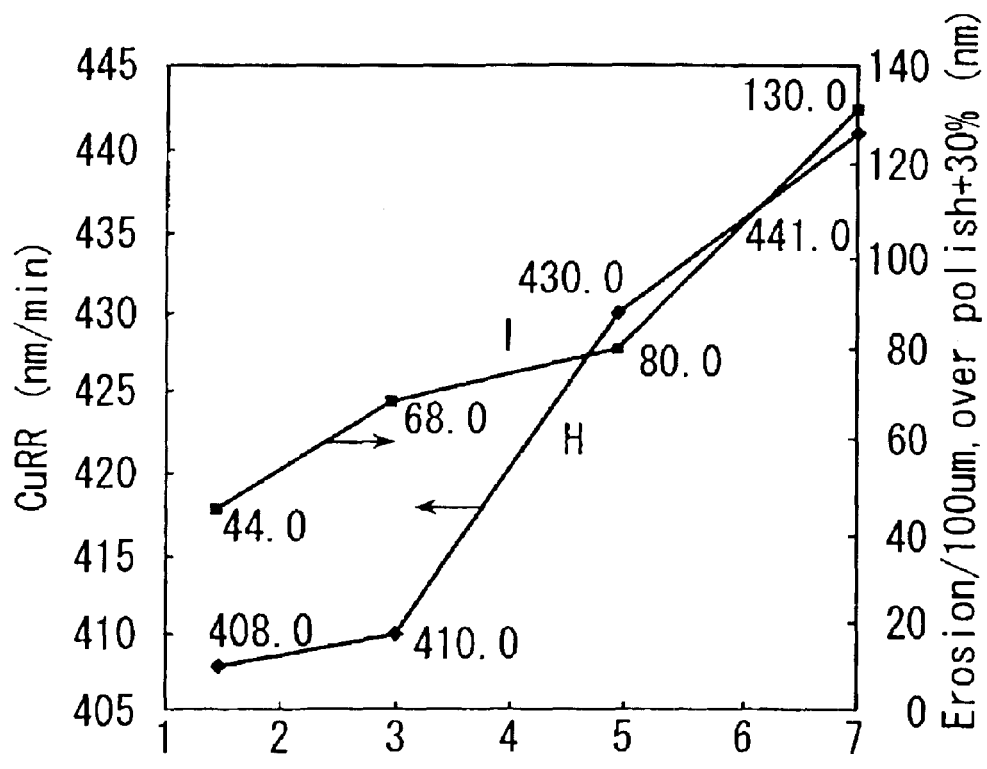
FIG. 10 is a graph illustrating the relationship between the degree of association of the colloidal particles included in a slurry for the CMP of Example 3 and the polishing speed of Cu (CuRR), and between the degree of association of the colloidal particles included in a slurry for the CMP of Example 3 and the erosion of wiring.

FIG. 10 shows the relationship between the degree of association of the colloidal silica particles (polishing particles) included in the CMP slurry of Example 3 and the polishing speed of Cu (CuRR), and between the degree of association of the colloidal silica particles (polishing particles) included in the CMP slurry of Example 3 and the erosion of wiring. In FIG. 10, the left ordinate represents the polishing speed (nm/min) of Cu, the right ordinate represents the magnitude (nm) of erosion, and the abscissa represents the degree of association of the colloidal silica particles. In FIG. 10, the curve H is a characteristic curve which represents the relationship between the changes in degree of association and the polishing speed of Cu; and the curve I is a characteristic curve which represents the relationship between the changes in degree of association and the magnitude of erosion.

As apparent from FIG. 10, as the degree of association of colloidal silica particles in the slurry was increased, the magnitude of erosion was proportionally increased. Further, it was confirmed that when the degree of association of colloidal silica particles exceeded over 5, a large number of fine scratches were generated on the Cu film as well as on the TaN film.

In contrast, when a Cu film was subjected to a CMP treatment by making use of the slurry of this Example 3 which contains colloidal silica particles having degree of association of 5 or less, the polishing rate of the Cu film was low, but the erosion of the surface of the Cu film was suppressed.

Whereas, when a Cu film was subjected to a CMP treatment by making use of the slurry containing colloidal silica particles having degree of association of 3 and a particle diameter of 25 nm, the magnitude of erosion was enabled to be controlled to as small as 68 nm as against 116 nm, i.e., a value which was indicated when the slurry of Comparative Example 1 containing fumed silica particles was employed as polishing particles (see FIG. 6).

As explained above, it is possible according to this Example 3 to improve the polishing speed of a metallic film such as Cu and to prominently minimize the generation of erosion, thereby making it possible to easily form a Cu damascene wiring.

EXAMPLE 4

Figure 11A:
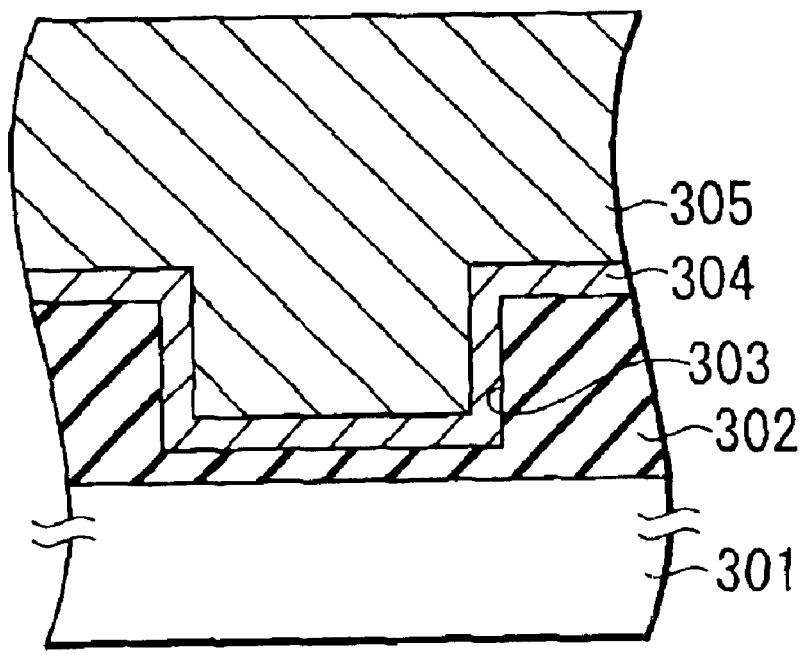
FIGS. 11A and 11B are cross-sectional views each illustrating the manufacturing process of semiconductor device according to Example 4 of the present invention.

First of all, as shown in FIG. 11A, an insulating film 302 consisting of silicon oxide for instance was formed on a silicon substrate (silicon wafer) 301 provided with a semiconductor element, for instance, and then, the surface of the insulating film 302 was flattened. Thereafter, the insulating film 302 was selectively etched to form a wiring groove 303 having a depth of 400 nm. Then, a TiN film 304 about 15 nm in thickness as a barrier film was deposited on the insulating film 302 as well as on the inner surface of the wiring groove 303. Thereafter, a W film 305 having a thickness of 600 nm was deposited on the TiN film 304 by means of CVD method.

Figure 11B:
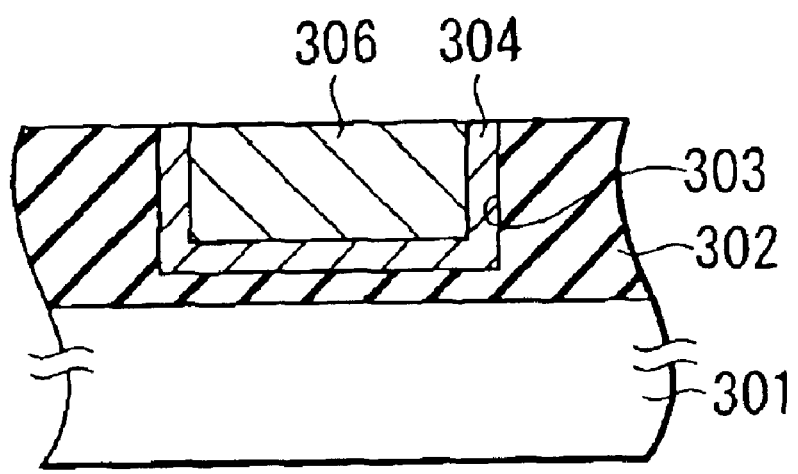

Then, the surfaces of the W film 305 and the TiN film 304 were successively subjected to a CMP treatment by making use of the polishing apparatus shown in FIGS. 1 and 2 and a CMP slurry having a composition shown below under the conditions as described below. As a result of this CMP treatment, the W film 306 (W damascene wiring) which was buried via the TiN film 304 inside the wiring groove 303 was enabled to be obtained as shown in FIG. 11B.

<The Composition of the CMP Slurry>

Polishing particles: A first colloidal silica particles having a primary particle diameter of 15 nm and the degree of association of 3.0 accounts for 2.5% by weight, and second colloidal silica particles having a primary particle diameter of 41 nm and a degree of association of 3.0 accounts for 0.3% by weight, and colloidal alumina particles having a primary particle diameter of 15 nm and a degree of association of 1.5 accounts for 0.2% by weight;

Ferric nitrate (oxidizing agent) accounts for 5% by weight;

Ammonium persulfate (oxidizing agent) accounts for 0.5% by weight;

Malonic acid (oxidation inhibitor) accounts for 1% by weight;

pH=1.5.

<Conditions for the CMP Treatment>

Polishing pad: IC1000/SUBA400 (tradename; Rodel Co., Ltd.);

Feeding rate of slurry: 200 cc/min;

Number of revolution of top ring (TR): 100 rpm;

Number of revolution of turn table (TT): 100 rpm;

Load (DF): 300 g/cm$^2$;

Polishing time: 160 seconds.

According to this Example 4, the magnitude of erosion (the width of wiring: 5 μm, +50 over-polishing) was 30 nm, thus indicating an improvement over the case where the slurry of Comparative Example 1 containing fumed silica was employed as polishing particles (180 nm in erosion during a polishing period of 210 seconds).

By the way, even if the CMP slurry of Example 1 containing, as polishing particles, the first and second colloidal silica particles is applied to the CMP treatment of a barrier film such as the Nb film of Example 2, the CMP treatment can be performed in the same manner as in Example 2 without giving damage to an underlying film of the Nb film, i.e. a Low-K insulating film which is soft, brittle and easily peelable such as an organic insulating film or a porous insulating film.

As explained above, it is possible, according to the present invention, to provide a slurry for CMP, which is capable of simultaneously inhibiting the erosion and scratching on the occasion of the CMP treatment of a conductive material film.

Further, it is also possible, according to the present invention, to provide a slurry for CMP, which is capable of accelerating the speed of CMP and also capable of inhibiting the erosion and scratching on the occasion of the CMP treatment of a conductive material film.

Further, it is also possible, according to the present invention, to provide a method of manufacturing a semiconductor device, which makes it possible to form and bury a wiring (damascene wiring) in a wiring groove of insulating film, the wiring being inhibited from being eroded and scratched.

Furthermore, it is also possible, according to the present invention, to provide a method of manufacturing a semiconductor device, which makes it possible to form and bury a wiring (damascene wiring) in a wiring groove of insulating film with a conductive barrier film being interposed between the wiring and the wiring groove, the wiring being inhibited from being eroded and scratched.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method of manufacturing a semiconductor device, which comprises:
    forming a wiring groove on a surface of an insulating film formed above a semiconductor substrate;
    depositing a conductive material film on a surface of said insulating film including an inner surface of said wiring groove; and
    subjecting said conductive material film to a chemical mechanical polishing by making use of a slurry for chemical mechanical polishing, which contains polishing particles comprising first colloidal silica particles whose primary particles have a diameter ranging from 5 to 20 nm, and second colloidal silica particles whose primary particles have a diameter ranging from 20 nm to 50 nm, wherein the weight ratio of the first colloidal silica particles is in the range of 0.6 to 0.9 based on a total weight of said first and second colloidal silica particles to remove said conductive material film excluding a conductive material film portion which is buried in said wiring groove.

2. The method of manufacturing a semiconductor device according to claim 1, wherein said conductive material film is a wiring material film.

3. The method of manufacturing a semiconductor device according to claim 2, wherein said wiring material film is a copper film.

4. The method of manufacturing a semiconductor device according to claim 1, wherein said conductive material film as a laminate film composed of two or more layers comprising a conductive barrier film made of at least one kind of materials selected from the group consisting of TiN, Ti, Nb, XV, WN, TaN, TaSiN, Ta, V, Mo, Zr and ZrN, and a wiring material film laminated on said barrier film, said wiring material film being subjected to said chemical mechanical polishing by making use of the slurry for chemical mechanical polishing.

5. The method of manufacturing a semiconductor device according to claim 4, wherein said wiring material film is subjected to a chemical mechanical polishing by making use of said slurry for chemical mechanical polishing, which contains polishing particles comprising first colloidal silica particles whose primary particles have a diameter ranging from 5 to 20 nm, and second colloidal silica particles whose primary particles have a diameter ranging from 20 to 50 wherein the weight ratio of the first colloidal silica particles is in the range of 0.6 to 0.9 based on a total weight of said first and second colloidal silica particles, and said conductive barrier film is subjected to a chemical mechanical polishing by making use of a slurry for chemical mechanical polishing, which contains polishing particles comprising colloidal silica particles whose primary particles have a diameter ranging from 5 to 30 nm, wherein the degree of association of the primary particles is 5 or less.

6. The method of manufacturing a semiconductor device according to claim 1, wherein said conductive material film is a laminate film composed of two or more layers comprising a conductive barrier film made of at least one kind of materials selected from the group consisting of TiN, Ti, Nb, W, WN, TaN, TaSiN, Ta, V, Mo, Zr and ZrN, and a wiring material film laminated on said barrier film, said laminate film being subjected to said chemical mechanical polishing by making use of said slurry for chemical mechanical polishing, which includes third particles formed of a material different from those of the first and second colloidal Silica particles, to remove said conductive material film excluding a conductive material film portion which is buried in said wiring groove.

7. The method of manufacturing semiconductor device according to claim 6, wherein said third particles arc colloidal alumina particles.

8. The method of manufacturing a semiconductor device according to claim 1, wherein said polishing particles are incorporated in said slurry at a ratio of 0.5 to 5% by weight.

9. The method of manufacturing a semiconductor device according to claim 1, wherein said slurry further contains an oxidizing agent and an oxidation inhibitor.

10. The method of manufacturing a semiconductor device according to claim 1, wherein said slurry further contains a surfactant.

11. The method of manufacturing a semiconductor device according to claim 10, wherein said surfactant is dodecyl benzene sulfonate.

12. A method of manufacturing a semiconductor device, which comprises:
    forming a wiring groove on a surface of an insulating film formed above a semiconductor substrate;
    depositing a conductive barrier film on a surface of said insulating film including an inner surface of said wiring groove;

depositing a wiring material film on said conductive barrier film to fill said wiring groove with said wiring material film;

subjecting said wiring material film to a chemical mechanical polishing to remove said wiring material film excluding a wiring material film portion which is buried in said wiring groove, said chemical mechanical polishing taking place, with the conductive barrier film on said insulating film being employed as a stopper, except for a conductive barrier film portion located inside said wiring groove; and subjecting a conductive barrier film portion which is located on said insulating film excluding said wiring groove to a chemical mechanical polishing by making use of a slurry for chemical mechanical polishing, which contains polishing particles comprising first colloidal silica particles whose primary particles have a diameter ranging from 5 to 20 nm, and second colloidal silica particles whose primary particles have a diameter ranging from 20 nm to 50 nm, wherein the weight ratio of the first colloidal silica particles is in the range of 0.6 to 0.9 based on a total weight of said first and second colloidal silica particles.

13. The method of manufacturing a semiconductor device according to claim 12, wherein said insulating film is a porous film or an organic film, each exhibiting a lower dielectric constant as compared with that of $SiO_2$.

14. The method of manufacturing a semiconductor device according to claim 12, wherein said conductive barrier film is composed of one or more layers made of a material selected from the group consisting of TiN, Ti, Nb, W, WN, TaN, TaSiN, Ta, V, Mo, Zr and ZrN.

15. The method of manufacturing a semiconductor device according to claim 12, wherein said polishing particles are incorporated in said slurry at a ratio of 0.5 to 5% by weight.

16. The method of manufacturing a semiconductor device according to claim 12, wherein said slurry further contains an oxidizing agent and an oxidation inhibitor.

17. The method of manufacturing a semiconductor device according to claim 12, wherein said slurry further contains a surfactant.

18. The method of manufacturing a semiconductor device according to claim 17, wherein said surfactant is dodecyl benzene sulfonate.

19. The method of manufacturing a semiconductor device according to claim 12, wherein said slurry further contains third particles which are formed of a different material from that of the first and second colloidal silica particles.

20. The method of manufacturing a semiconductor device according to claim 19, wherein said third particles are colloidal alumina particles.

* * * * *

UNITED STATES PATENT AND TRADEMARK OFFICE
CERTIFICATE OF CORRECTION

PATENT NO. : 6,924,227 B2
DATED : August 2, 2005
INVENTOR(S) : Minamihaba et al.

It is certified that error appears in the above-identified patent and that said Letters Patent is hereby corrected as shown below:

Title page,
Item [57], ABSTRACT,
Line 2, after "chemical" insert -- mechanical --.

Column 17,
Line 60, change "5to" to -- 5 to --.

Column 18,
Line 9, change "as a laminate" to -- is a laminate --.
Line 12, change "XV," to -- W, --.
Line 23, after "20 to 50" insert -- nm, --.
Line 43, change "Silica" to -- silica --.
Line 46, after "manufacturing" insert -- a --.
Line 47, change "arc" to -- are --.

Column 19,
Line 18, change "5to" to -- 5 to --.

Signed and Sealed this

First Day of November, 2005

JON W. DUDAS
*Director of the United States Patent and Trademark Office*